United States Patent
Balachandran et al.

(10) Patent No.: US 7,020,185 B1
(45) Date of Patent: Mar. 28, 2006

(54) METHOD AND APPARATUS FOR DETERMINING CHANNEL CONDITIONS IN A COMMUNICATION SYSTEM

(75) Inventors: Krishna Balachandran, Middletown, NJ (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 554 days.

(21) Appl. No.: 09/724,231

(22) Filed: Nov. 28, 2000

(51) Int. Cl.
*H04B 1/38* (2006.01)

(52) U.S. Cl. .............. 375/219; 375/222; 375/332; 370/465

(58) Field of Classification Search .............. 375/224, 375/262, 265, 141, 332, 219, 222; 370/252, 370/320, 335, 338, 342, 206–208, 516, 470, 370/465; 455/422.1, 450; 714/755
See application file for complete search history.

(56) References Cited

U.S. PATENT DOCUMENTS

| | | |
|---|---|---|
| 4,493,082 A | 1/1985 | Cumberton et al. |
| 5,119,400 A | 6/1992 | Koch |
| 5,134,635 A | 7/1992 | Hong et al. |
| 5,144,644 A | 9/1992 | Borth |
| 5,164,961 A | 11/1992 | Gudmundson |
| 5,271,042 A | 12/1993 | Borth et al. |
| 5,313,495 A | 5/1994 | Kim |
| 5,390,198 A | 2/1995 | Higgins |
| 5,406,562 A | 4/1995 | Roney, IV |
| 5,453,997 A | 9/1995 | Roney, IV |
| 5,479,419 A | 12/1995 | Naoi et al. |
| 5,493,584 A | 2/1996 | Emeott |
| 5,502,735 A | 3/1996 | Cooper |
| 5,537,444 A | 7/1996 | Nill et al. |
| 5,566,191 A | 10/1996 | Ohnishi et al. |
| 5,579,344 A | 11/1996 | Namekata |
| 5,581,577 A | 12/1996 | Abe |
| 5,754,600 A | 5/1998 | Rahnema |
| 5,757,821 A | 5/1998 | Jamal et al. |
| 5,768,285 A | 6/1998 | Griep et al. |
| 5,802,116 A | 9/1998 | Baker et al. |
| 5,809,071 A | 9/1998 | Kobayashi et al. |
| 5,818,876 A | 10/1998 | Love |

(Continued)

OTHER PUBLICATIONS

Ericsson; EGPRS Link Quality Control Measurements and Filtering; ETSI SMG2 Working Session on EDGE; Aug. 24-27, pp. 1-7; 1999; Paris, France.

(Continued)

*Primary Examiner*—Young T. Tse
*Assistant Examiner*—Edith Chang

(57) ABSTRACT

One example of symbol or bit error probability estimation in a communication system using soft decision information determines soft decision metric(s) for each symbol that is received over a communication channel and employs the soft decision metric(s) to obtain an estimate of symbol or bit error probability.

11 Claims, 4 Drawing Sheets

BLOCK DIAGRAM OF SYSTEM

AWGA – ADDITIVE WHITE GAUSSIAN NOISE
MAP – MAXIMUM A POSTERIORI (BCJR – BAHL, COCKE, JELINEK AND RAVIV [3])
SOVA – SOFT OUTPUT VITERBI ALGORITHM

U.S. PATENT DOCUMENTS

| | | | |
|---|---|---|---|
| 5,838,697 A | | 11/1998 | Abe |
| 5,844,946 A | | 12/1998 | Nagayasu |
| 5,864,589 A | | 1/1999 | Mourot et al. |
| 5,867,531 A | | 2/1999 | Shiino et al. |
| 5,950,124 A | * | 9/1999 | Trompower et al. ...... 455/422.1 |
| 6,141,388 A | * | 10/2000 | Servais et al. .............. 375/262 |
| 6,400,724 B1 | * | 6/2002 | Yao ............................ 370/429 |
| 6,539,031 B1 | * | 3/2003 | Ngoc et al. ................. 370/470 |
| 6,597,743 B1 | * | 7/2003 | Khayrallah et al. ......... 375/265 |
| 6,760,347 B1 | * | 7/2004 | Ojard et al. ................ 370/516 |

OTHER PUBLICATIONS

Hagenauer, Joachim; Hoeher, Peter; A Viterbi Algorithm with Soft-Decision Outputs and its Applications; 1989; pp. 1680-1686; IEEE; New York, N.Y.

Bahl, L.R.; Cocke, F; Jelinek; and Raviv, J.; Optimal Decoding of Linear Codes for Minimizing Symbol Error Rate; IEEE Transactions on Information Theory; Mar., 1974; pp. 284-287; New York, N.Y.

* cited by examiner

COMPUTATION OF MEAN SEP (METHOD 1)

COMPUTATION OF MEAN SEP (METHOD 2)

USE OF MEAN BEP OR SEP FOR RATE ADAPTATION AND POWER CONTROL

MEAN BIT ERROR PROBABILITY ESTIMATE FOR DIFFERENT ENVIRONMENTS AND MOBILE SPEEDS; HT3 REPRESENTS THE CHANNEL MODEL FOR A MOBILE SPEED OF 3 km/h IN A HILLY TERRAIN ENVIRONMENT

METHOD AND APPARATUS FOR DETERMINING CHANNEL CONDITIONS IN A COMMUNICATION SYSTEM

TECHNICAL FIELD

The invention in one embodiment relates generally to communication networks and, more particularly, to communications over wireless and cellular data networks.

BACKGROUND

With the rapid growth of wireless communications, the industry is developing and implementing a variety of transmission protocols in order to provide faster, more robust and more efficient communications. System performance can be improved by choosing the appropriate symbol rate, modulation and coding scheme and transmit power under the prevailing channel conditions. In order to select the best protocol, the transmitting station must have reliable current knowledge of the prevailing channel conditions at the receiver. Determining the prevailing channel conditions has proven to be computationally complex and susceptible to error. Accordingly, there is a need for a reliable, simple, efficient way to obtain current knowledge of the prevailing channel conditions in a communication link

DETAILED DESCRIPTION

Figure 1:
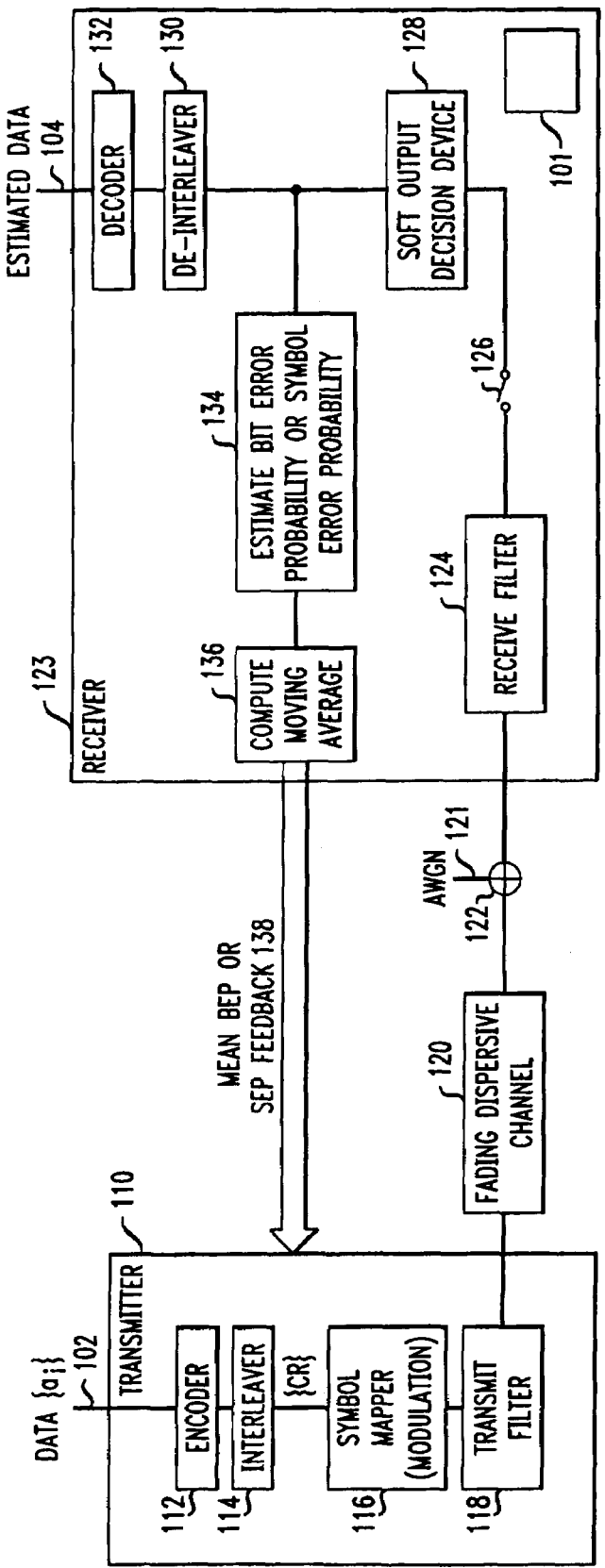
FIG. 1 is a block diagram of one example of a system.

Turning to FIG. 1, the system 100 in one example includes a plurality of components such as computer software and/or hardware components. A number of such components can be combined or divided in different configurations. For example, the invention may be implemented employing at least one computer-readable signal-bearing medium. One example of a computer-readable signal-bearing medium comprises an instance of recordable data storage medium 101 such as one or more of a magnetic, optical, biological, and atomic data storage medium. In another example, a computer-readable signal-bearing medium comprises a modulated carrier signal transmitted over a network comprising or coupled with systems over a local area network ("LAN"), the Internet, and a wireless network. An exemplary component of a system employs and/or comprises a series of computer instructions written in or implemented with any of a number of programming languages, as will be appreciated by those skilled in the art.

Referring to FIG. 1, in one example, system 100 includes a transmitter 110 which receives data 102 to be transmitted. Data 102 in one example, can be represented as an information bit sequence $\{a_k\}$. Encoder 112 in one example comprises a block encoder or a convolutional encoder. For example, encoder 112 encodes the information bit sequence $\{a_k\}$ to output a coded sequence $\{c_k\}$. An interleaver 114 interleaves the coded sequence $\{c_k\}$. Coded sequence $\{c_k\}$ is then mapped to a symbol sequence by a symbol mapper 116. At symbol mapper 116, each symbol is chosen from an M-ary signal constellation. In other words, the Coded sequence $\{c_k\}$ is transformed into a finite set of M-ary symbols where M corresponds to the number of symbols.

The code rate and symbol mapping are chosen based on channel quality feedback from a receiver in the manner described below. A transmit filter 118 performs pulseshaping to improve waveform characteristics for transmission of the signal over the air or other transmission medium. The resulting signal is transmitted over a fading dispersive channel 120. The signal is also degraded by additive white gaussian noise (AWGN) 121 input to the channel at adder 122.

Receiver 123 receives the transmitted signal the over fading dispersive channel 120. Front end analog receive filter 124 processes the incoming signal from fading dispersive channel 120. Receive filter 124 is matched to operate with transmit filter 118. Sampler 126 periodically samples the output of receive filter 124.

Multipath or time dispersion characteristics can result in inter symbol interference (ISI) that significantly degrades performance. Decision device 128 is typically employed in order to mitigate the effect of ISI. It is possible to use a decision device that provides either hard (e.g., binary) outputs corresponding to the received raw symbol sequence or to employ a decision device that provides soft outputs in the form of probabilities or log likelihood ratios. System 100 in one example uses a decision device 128 at the receiver to provide soft outputs.

Soft outputs may be obtained from appropriate decoders or equalizers. For example, minimum Euclidean distance decoders (e.g., Viterbi decoders) can use soft outputs in order to carry out soft decision decoding (See J. Hagenauer and P. Hoeher, "A Viterbi Algorithm with Soft Decision Outputs and its Applications," *Proceedings, IEEE Globecom,* 1989 incorporated herein by reference). Examples of equalization techniques that can generate log likelihood ratios include the Bahl-Cocke-Jelinek-Raviv (BCJR) *Maximum a Posteriori* (MAP) algorithm, L. R. Bahl, J. Cocke, F. Jelinek and J. Raviv, "Optimal Decoding of Linear Codes for Minimizing Symbol Error Rate," *IEEE Trans. On Information Theory,* Vol. IT-20, pp. 284–287, March 1974, and the *Soft Output Viterbi Algorithm* (SOVA), J. Hagenauer and P. Hoeher, "A Viterbi Algorithm with Soft Decision Outputs and its Applications," *Proceedings, IEEE Globecom,* 1989, incorporated herein by reference for background purposes.

The soft outputs used in system 100 are obtained from decision device 128 which can be either an equalizer or a demodulator or both. In general, soft outputs represent the likelihood or probability of each received raw symbol being the value that it is assumed to be for decoding operations. For example, in the case of a binary transmission, (M=2), the soft outputs represent the probability of each raw symbol being a '1' ($p_1$) or a '0' ($p_0$). In another aspect of system 100, decision device 128 generates a log likelihood ratio (i.e., $\log(p_1)-\log(p_0)$) value for each raw symbol.

Figure 2:
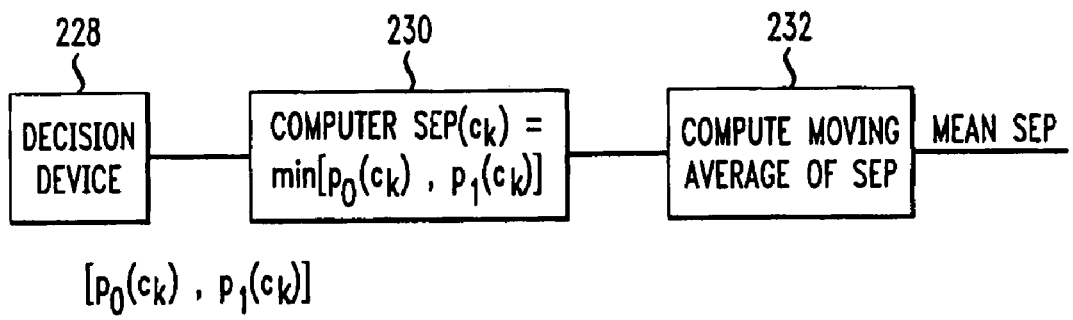
FIG. 2 is a block diagram of exemplary components for computing symbol error probability in the system of FIG. 1.

Regardless of whether log likelihood ratios or probabilities are obtained from decision device 128, the values corresponding to each symbol need to be averaged to obtain an error rate estimate that is representative of channel conditions. Two methods for computing the mean Symbol Error Probability (SEP) are shown for purposes of illustration. A first method is shown in FIG. 2. For each raw symbol, $c_k$, decision device 228 generates the a posteriori probability mass function, $p_1(c_k)$ and $p_0(c_k)$, from the set of observations at the output of the communication channel where $p_1(c_k)$=Probability{$c_k$=1| observations at decision device input} and $$p_0(c_k)=(1-p_1(c_k)).$$

From $p_0$ and $p_1$, processor 230 computes the SEP for $c_k$ as $$SEP(c_k)=\min[p_0(c_k), p_1(c_k)].$$

Processor 232 then computes the mean SEP or mean symbol error rate estimate as a moving average of symbol error probabilities. Of course, calculating a moving average of symbol error probabilities can be done in a variety of different ways as would be familiar to one of ordinary skill in the art. The mean SEP output from processor 232 is provided as feedback to transmitter 110. Transmitter 110 compares the mean SEP to pre-determined thresholds in order to determine the coding and modulation scheme, signal power, or other communication protocol to use for subsequent transmissions. Alternatively, selection of appropriate coding and modulation schemes, signal power, or other communication protocol can be performed at the receiver 123. In such case, receiver 123 signals transmitter 110 to use the new protocol.

Figure 3:
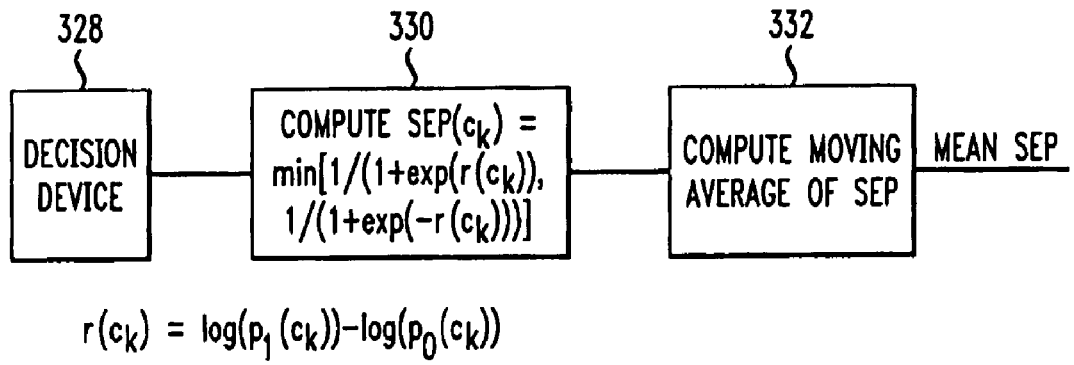
FIG. 3 is a block diagram of exemplary components for computing symbol error probability in the system of FIG. 1.

In another example, shown in FIG. 3, decision device 328 generates a log likelihood ratio, $r(c_k)=\log(p_1)-\log(p_0)$. Assuming logarithms to the base e, $p_1$ and $p_0$ are computed by using $p_0=(1-p_1)$, as follows:

$$p_1(c_k)=1/(1+\exp(r(c_k)))$$

$$p_0(c_k)=1/(1+\exp(-r(c_k)))$$

From $p_0$ and $p_1$, processor 330 computes the symbol error probability (SEP) for $c_k$ as $$SEP(c_k)=\min[p_0(c_k), p_1(c_k)].$$

Figure 4:
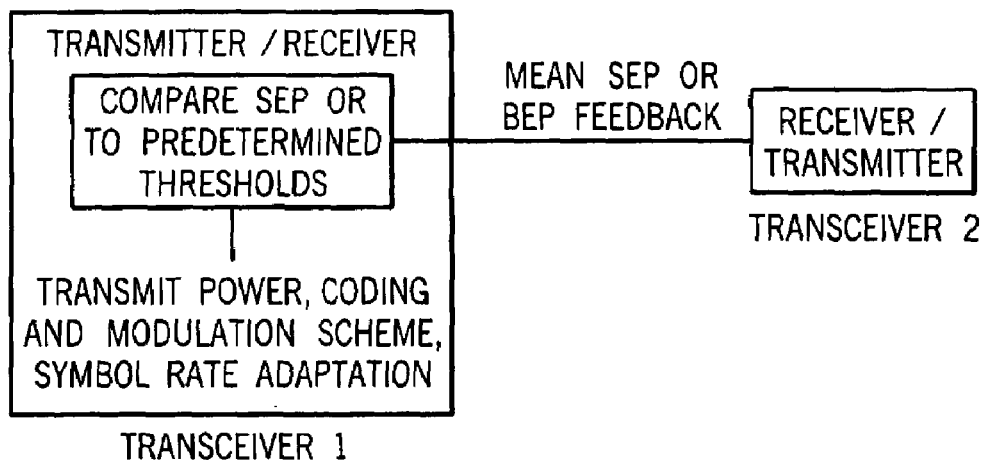
FIG. 4 is a block diagram of an exemplary employment of symbol error probability for selection of modulation and coding schemes, for rate adaptation and power control in the system of FIG. 1.

Processor 332 then computes the mean SEP as a moving average of the SEPs for each raw symbol. The mean SEP output from processor 332 is then provided as feedback to transmitter 110. As noted with regard to the example of FIG. 2, transmitter 110 compares the mean SEP to pre-determined thresholds in order to determine the coding and modulation scheme or other communication protocol to use for subsequent transmissions. FIG. 4 depicts a block diagram of an exemplary communication system employing mean SEP for MCS, rate adaptation and power control.

Figure 5:
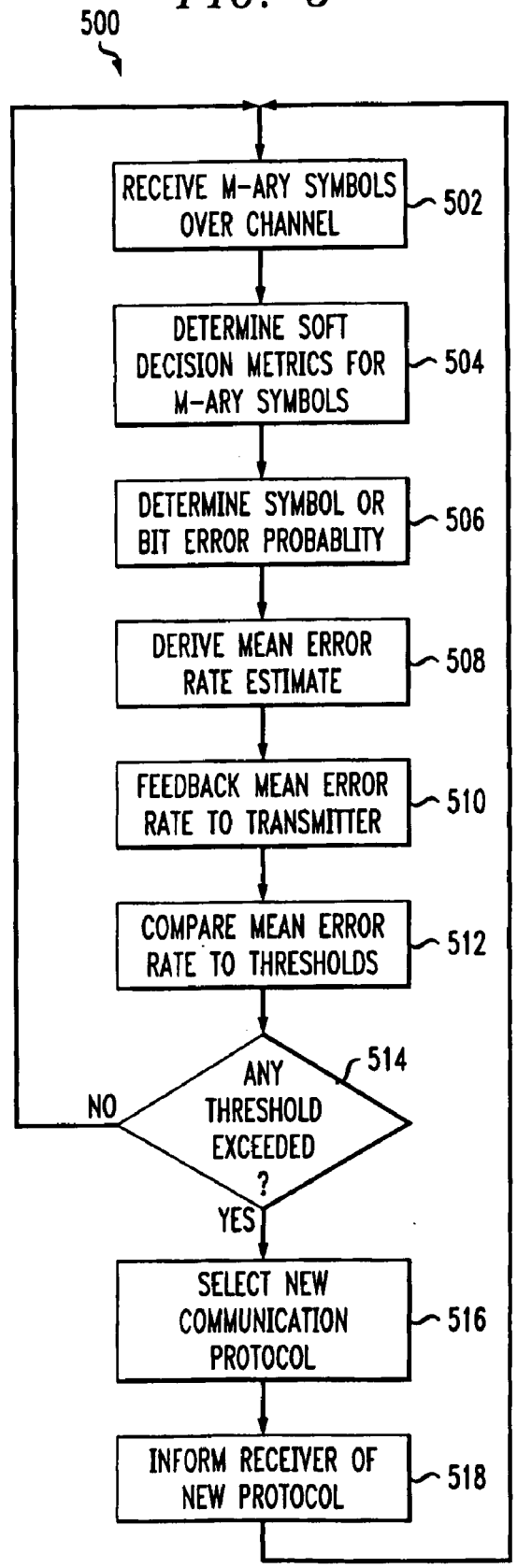
FIG. 5 is a flow diagram illustrating determination of channel conditions in the system of FIG. 1.

A flowchart generally illustrating the operation of system 100 is shown in FIG. 5. In the method 500, M-ary symbols are received over a communications channel in step 502. A decision device at a communication receiver determines soft decision metrics for each of the M-ary symbols received in step 504. These soft decision metrics may be calculated according to the a posteriori probability mass function, $\{p_0, p_1, p_2, p_M\}$, as explained above. In Step 506, SEPs are determined for each of the M-ary symbols from the probabilities determined in step 504 using $$SEP=1-\max(p_0, p_1, p_2, \ldots, p_M).$$

Alternatively, the decision device determines the a posteriori probability mass function, $\{p_0, p_1\}$ for each of the $\log_2 M$ bits represented by an M-ary symbol received in step 504. In Step 506, the Bit Error Probability (BEP) is computed for each of these bits from the probabilities determined in step 504 using $$BEP=1-\max(p_0, p_1).$$

In order to obtain a good overall error rate estimate, a moving average of the SEPs or BEPs is calculated in step 508. The moving average is fed back to the transmitter in step 510. The transmitter compares the moving average to thresholds in step 512 and determines in step 514 whether any predetermined thresholds for communication protocol changes have been met or exceeded. If a threshold has been met or exceeded, the transmitter selects a new communication protocol in step 516 and informs the receiver of the new protocol in step 518. Alternatively, the receiver can employ the symbol error probability to select a communication protocol and signal the transmitter to implement the new communication protocol. The new protocol is implemented and the process of determining the reliability of the communication channel repeats under the new protocol.

As shown in FIG. 4, in addition to MCS selection, virtually any communication protocol that is changed depending on a change in channel conditions can be modified based on SEP or BEP estimates made according to system 100. In general, system 100 will prove useful in information transmission systems where SEP or BEP estimates are used to adjust modulation and coding schemes or other communication protocols in response to changing channel conditions and where soft outputs can be derived from a decision device at the receiver. For example, in addition to selecting the best modulation and coding scheme, system 100 can be used in connection with the adjustment of transmitter power levels and in making handover decisions. System 100 is applicable to both uplink and downlink communications.

Simulations were carried out in order to study the behavior of the mean BEP determined according to system 100. The simulations assume 8-PSK (M=8, i.e., 8 phase shift keying) modulation, GSM symbol rate, training sequence and burst structure. Both Typical Urban (TU) and Hilly Terrain (HT) channel models are considered and different mobile speeds are assumed.

Figure 6:
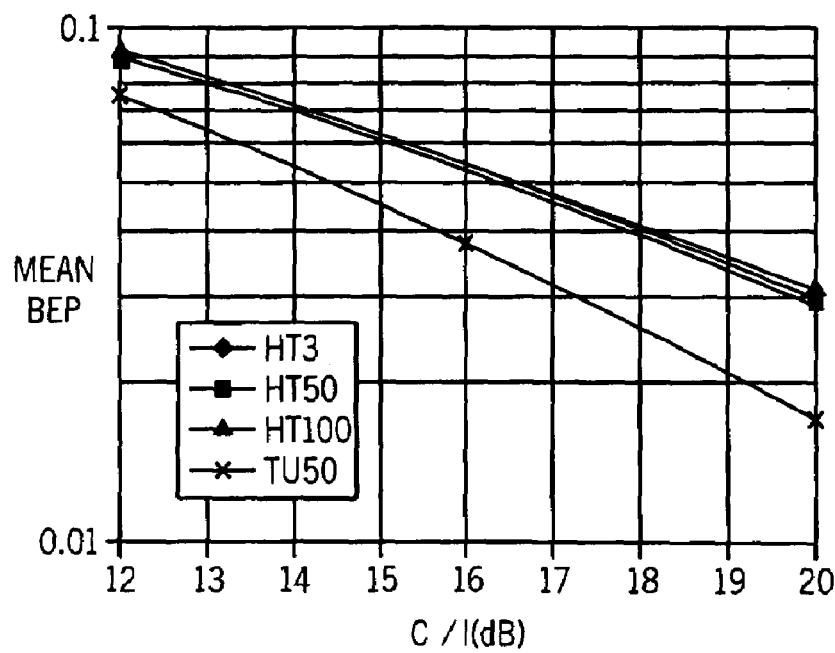
FIG. 6 is a graph showing curves of the mean bit error probability (vertical scale) versus carrier to interference ratio (horizontal scale) computed for different environments and mobile speeds for the system of FIG. 1.

FIG. 6 shows the mean BEP as a function of carrier to interference ratio (C/I) for different environments and mobile speeds. The results indicate that for a fixed delay spread environment (e.g., HT), the mean BEP is invariant across mobile speeds. The mean BEP also shows more degradation as the amount of dispersion increases. This validates the BEP measure derived according to system 100 since it includes the effect of the received signal and interference power as well as other receiver impairments. This behavior is also consistent with the Bit Error Rate performance that would be observed in the uncoded case.

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
   transmitting from a transmitter of a first transceiver a plurality of symbols over a communication channel that imparts inter-symbol interference to said symbols;
   receiving at a receiver of a second transceiver said symbols;
   determining a soft decision metric at the receiver of the second transceiver for the plurality of symbols;
   employing the soft decision metric at the receiver of the second transceiver to determine mean symbol error probability or mean bit error probability;
   transmitting from the second transceiver to the first transceiver a signal that carries said mean symbol error probability or mean bit error probability;
   comparing at the first transceiver the mean symbol error probability or the mean bit error probability to one or more predetermined thresholds to select a communication channel;
   wherein the first transceiver implements a first communication protocol for the communication channel upon the means symbol error probability or the mean bit error probability exceeding a first threshold of the one or more predetermined thresholds;
   wherein the first transceiver implements a second communication protocol for the communication channel upon the mean symbol error probability or the mean bit error probability exceeding a second threshold of the one or more predetermined thresholds.

2. The method of claim 1 wherein the step of determining the soft decision metric comprises deriving the soft decision metric from an output of at least one of an equalizer and a demodulator of the receiver of the second transceiver.

3. The method of claim 2, wherein the output of the equalizer and demodulator comprises a log likelihood ratio.

4. The method of claim 1, wherein the transmitted symbols comprise binary values.

5. The method of claim 1, wherein the step of comparing the mean symbol error probability or the mean bit error probability to the one or more predetermined thresholds to select the communication protocol of the communication channel comprises a step of selecting at least one of a modulation scheme, a coding scheme, symbol rate, and a power level.

6. The method of claim 1, wherein the step of employing the soft decision metric at the receiver of the second transceiver to determine the mean symbol error probability or the mean bit error probability consists of employing only the soft decision metric to determine the mean symbol error probability or the mean bit error probability.

7. A system comprising:
   a transmitter of a first transceiver adapted to transmit a plurality of symbols over a communication channel that imparts inter-symbol interference to said symbols;
   a receiver of a second transceiver adapted to receive said symbols;
   a decision device in the receiver of the second transceiver adapted to provide a plurality of soft decision metrics for the plurality of symbols received over the communication channel;
   a processor in the receiver of the second transceiver employs the soft decision metric to determine mean symbol error probability or mean bit error probability;
   means for transmitting from the second transceiver to the first transceiver a signal that carries said mean symbol error probability or said mean bit error probability; and
   a processor in the first transceiver compares the mean symbol error probability or the mean bit error probabilities to one or more predetermined thresholds to select a communication protocol of the communication channel;
   the first transceiver implements a first communication protocol for the communication channel upon the mean symbol error probability or the mean bit error probability exceeding a first threshold of the one or more predetermined thresholds and implements a second communication protocol for the communication channel upon the mean symbol error probability or the mean error probability exceeding a second threshold of the one or more predetermined thresholds.

8. The system of claim 7, wherein the decision device comprises one or more of a demodulator and an equalizer.

9. The system of claim 7, wherein the decision device performs demodulation through employment of a Viterbi decoder algorithm or a variant of the Viterbi decoder algorithm.

10. The system of claim 7, wherein the decision device performs equalization through employment of one or more of a Bahl-Cocke-Jelinek-Raviv algorithm, a soft output Viterbi algorithm, a variant of the Bahl-Cocke-Jelinek-Raviv algorithm, and a variant of the soft output Viterbi algorithm.

11. The system of claim 7 wherein the decision device in the receiver of the second transceiver provides only the soft decision metrics for the plurality of symbols received over the communication channel and the processor in the receiver of the second transceiver employs only the soft decision metrics determine the mean symbol error probability or the mean bit error probability.

* * * * *